(12) United States Patent
Favaretto

(10) Patent No.: US 8,397,849 B2
(45) Date of Patent: Mar. 19, 2013

(54) HYBRID PROPULSION ROAD VEHICLE

(75) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 579 days.

(21) Appl. No.: 12/653,839

(22) Filed: Dec. 18, 2009

(65) Prior Publication Data

US 2010/0175935 A1 Jul. 15, 2010

(30) Foreign Application Priority Data

Dec. 18, 2008 (IT) .............................. BO2008A0759

(51) Int. Cl.
*B60K 6/42* (2007.10)

(52) U.S. Cl. .................................. 180/65.22; 180/65.31

(58) Field of Classification Search .... 180/65.22–65.26; 903/920, 951

See application file for complete search history.

(56) References Cited

U.S. PATENT DOCUMENTS

| | | | | |
|---|---|---|---|---|
| 4,042,054 A * | 8/1977 | Ward | ............................... | 180/60 |
| 4,405,029 A * | 9/1983 | Hunt | ........................ | 180/65.25 |
| 5,172,784 A * | 12/1992 | Varela, Jr. | ................ | 180/65.245 |
| 5,224,563 A * | 7/1993 | Iizuka et al. | ............... | 180/65.21 |
| 5,904,631 A * | 5/1999 | Morisawa et al. | ................ | 475/5 |
| 6,041,877 A * | 3/2000 | Yamada et al. | ............. | 180/65.25 |
| 6,321,865 B1 * | 11/2001 | Kuribayashi et al. | ......... | 180/243 |
| 6,349,782 B1 * | 2/2002 | Sekiya et al. | ............. | 180/65.25 |
| 6,510,911 B1 * | 1/2003 | Satou et al. | ............. | 180/65.245 |
| 6,569,055 B2 * | 5/2003 | Urasawa et al. | .................. | 477/5 |
| 6,589,128 B2 * | 7/2003 | Bowen | .............................. | 475/5 |
| 6,810,977 B2 * | 11/2004 | Suzuki | ....................... | 180/65.25 |
| 7,081,725 B2 * | 7/2006 | Seely et al. | .................... | 318/139 |
| 7,143,851 B2 * | 12/2006 | Masterson | ................. | 180/65.25 |
| 7,174,978 B2 * | 2/2007 | Taniguchi et al. | ........... | 180/65.1 |
| 7,185,722 B1 * | 3/2007 | Sakamoto et al. | ......... | 180/65.25 |
| 7,240,748 B2 * | 7/2007 | Kira et al. | .................. | 180/65.25 |
| 7,426,971 B2 * | 9/2008 | Kano et al. | ................. | 180/65.25 |
| 7,455,135 B2 * | 11/2008 | Janson et al. | .............. | 180/65.31 |
| 2001/0039230 A1 * | 11/2001 | Severinsky et al. | ............... | 477/3 |
| 2002/0043410 A1 * | 4/2002 | Suzuki | ......................... | 180/65.2 |
| 2003/0034188 A1 * | 2/2003 | Gotou | ......................... | 180/65.2 |

(Continued)

FOREIGN PATENT DOCUMENTS

JP 4-358983 A 12/1992
WO WO-2006/137188 A1 12/2006

(Continued)

OTHER PUBLICATIONS

"Italian Application Serial No. IT B020080759, Search Report dated Aug. 20, 2009", 2 pgs.

*Primary Examiner* — Hau Phan
*Assistant Examiner* — Jacob Meyer
(74) *Attorney, Agent, or Firm* — Schwegman Lundberg & Woessner, P.A.

(57) ABSTRACT

A hybrid propulsion road vehicle having: a couple of rear driving wheels; a thermal internal combustion engine; a gearbox, which is arranged in rear position, receives motion from the thermal internal combustion engine and transmits motion to the rear driving wheels, and comprises a gear case housing all the moving parts; a reversible electric machine mechanically connectable to the rear driving wheels; an electric drive controlling the electric machine; and an accumulating system, which is able to store electric energy, is connected to the electric drive and is placed beside the gear case and on the opposite sides of the gear case so as not to longitudinally exceed the extension of the gear case itself.

8 Claims, 1 Drawing Sheet

U.S. PATENT DOCUMENTS

| | | | |
|---|---|---|---|
| 2004/0040760 A1* | 3/2004 | Kadota | 180/65.2 |
| 2004/0050599 A1* | 3/2004 | Krzesicki et al. | 180/65.3 |
| 2004/0200654 A1* | 10/2004 | Hatsuda et al. | 180/243 |
| 2004/0251065 A1* | 12/2004 | Komiyama et al. | 180/65.4 |
| 2005/0061567 A1* | 3/2005 | Kim | 180/243 |
| 2005/0067202 A1* | 3/2005 | Shimizu | 180/65.2 |
| 2005/0139401 A1* | 6/2005 | Fujioka | 180/65.2 |
| 2005/0211479 A1* | 9/2005 | Tamor | 180/65.2 |
| 2006/0000651 A1* | 1/2006 | Stabler | 180/65.3 |
| 2006/0021809 A1* | 2/2006 | Xu et al. | 180/65.2 |
| 2006/0196710 A2* | 9/2006 | Banginski et al. | 180/65.2 |
| 2009/0223725 A1* | 9/2009 | Rodriguez et al. | 180/65.21 |
| 2009/0288893 A1* | 11/2009 | Wyall et al. | 180/65.22 |
| 2010/0000808 A1* | 1/2010 | Delisle et al. | 180/65.26 |
| 2010/0044129 A1* | 2/2010 | Kyle | 180/65.25 |
| 2010/0193269 A1* | 8/2010 | Fuchtner et al. | 180/65.22 |
| 2010/0307845 A1* | 12/2010 | Ogata | 180/65.22 |
| 2011/0079454 A1* | 4/2011 | Maguire et al. | 180/65.25 |
| 2011/0083917 A1* | 4/2011 | Badreddine et al. | 180/65.23 |
| 2011/0094809 A1* | 4/2011 | Poschmann et al. | 180/65.225 |
| 2011/0251018 A1* | 10/2011 | Kim et al. | 477/5 |

FOREIGN PATENT DOCUMENTS

WO  WO-2007/135428 A1  11/2007

* cited by examiner

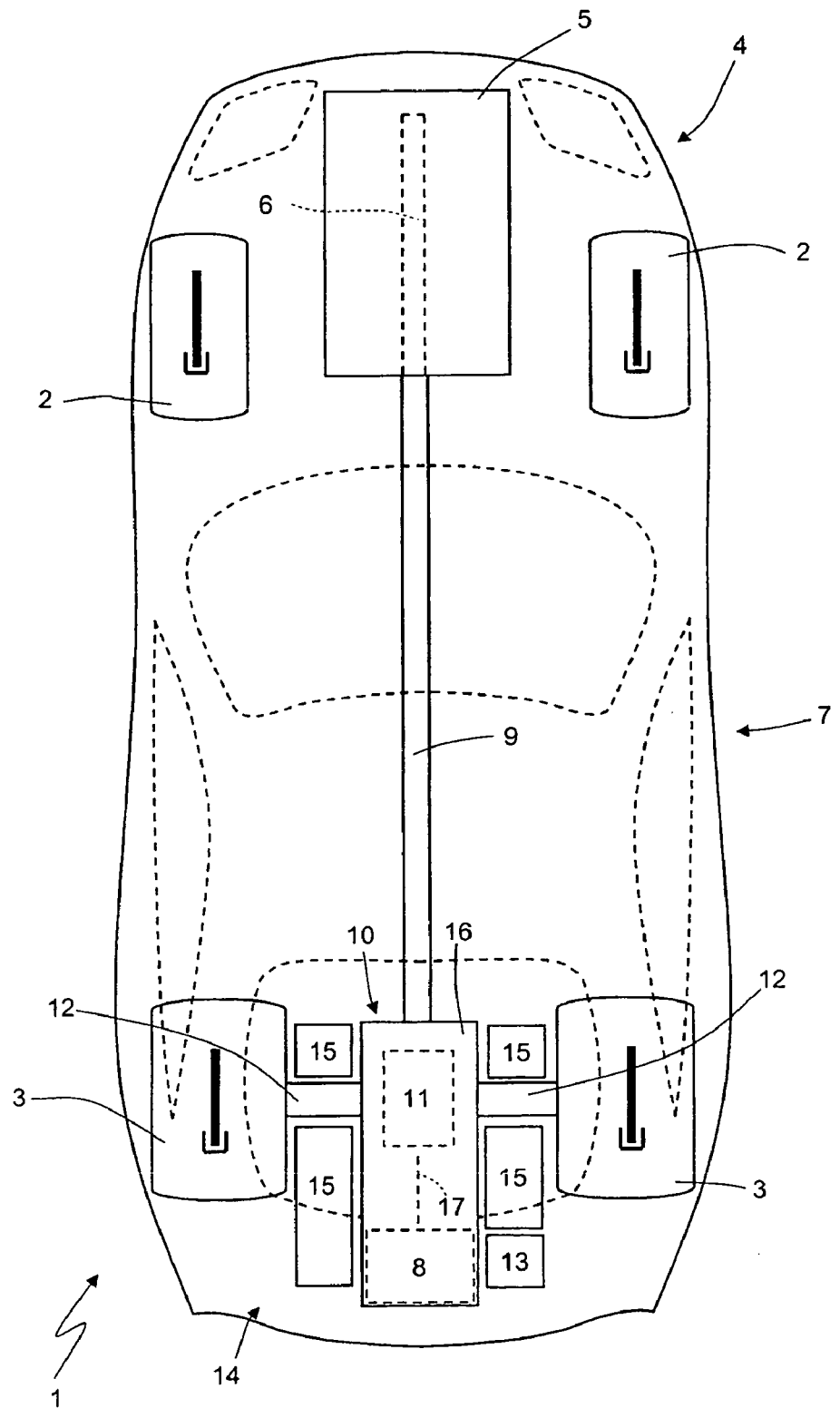

HYBRID PROPULSION ROAD VEHICLE

RELATED APPLICATION

This application claims the benefit of priority, under 35 U.S.C. Section 119, to Italian Patent Application Serial No. B02008A 000759, filed on Dec. 18, 2008, which is incorporated herein by reference in its entirety.

TECHNICAL FIELD

The present invention relates to a hybrid propulsion road vehicle.

PRIOR ART

A hybrid road vehicle comprises an internal combustion engine which transmits the driving torque to the driving wheels by means of a transmission provided with a gearbox, and at least one electric machine which is mechanically connected to the driving wheels. The electric machine is controlled by an electric drive connected to an electric accumulating system typically made of a pack of chemical batteries possibly connected in parallel to one or more super-capacitors.

While the road vehicle is running, there are possible: a thermal operating mode, in which the driving torque is only generated by the combustion engine and possibly the electric machine acts as a generator for recharging the electric accumulating system; an electric operating mode, in which the combustion engine is switched off and the driving torque is only generated by the electric machine acting as an engine; or a combined operating mode, in which the driving torque is generated by both the combustion engine and the electric machine acting as an engine. Moreover, in order to increase the overall energy efficiency during all the steps of deceleration, the electric machine may be used as a generator for achieving a regenerative deceleration in which the kinetic energy of the road vehicle is partially converted into electric power that is stored in the electric accumulating system instead of being completely dissipated in frictions.

The placement of the accumulating system within the road vehicle may be very complex especially in the event of a high-performing sports road vehicle presenting very reduced internal spaces. Specifically, the accumulating system must possibly be placed in proximity of the electric machine and the electric drive for reducing the length of the connecting electric cables (thus reducing the weight of the electric cables and the power losses by Joule effect in the electric cables themselves), it must be arranged in a position protected from impacts as it is potentially subject to explode in case of very strong compression, it must be arranged in a position sheltered from the heat sources as it does not withstand high temperatures, it must be arranged in a vented position in order to have the possibility of venting the gas towards the outside in case of failure, and it must be arranged so as not to unbalance the road vehicle by means of its own considerable mass (in other words, as close as possible to the centre of gravity and to the ground in order to obtain a good dynamic behaviour of the road vehicle).

In known vehicles, the above-mentioned constraints force the arrangement of the batteries of the accumulating system in not optimal positions, also severely limiting the useful space; consequently, the ability of storing electric power by the accumulating system is limited and thereby the chances of using the electric machine are also reduced.

DESCRIPTION OF THE INVENTION

It is the object of the present invention to provide a hybrid propulsion road vehicle, which is free from the above-described drawbacks and is both easy and cost-effective to be implemented.

According to the present invention, there is provided a hybrid propulsion road vehicle as claimed in the attached claims.

BRIEF DESCRIPTION OF THE DRAWING

The present invention will now be described with reference to the attached drawing.

FIG. 1 shows a non limiting exemplary embodiment thereof; specifically, the accompanying FIGURE is a schematic view of a hybrid propulsion road vehicle built in accordance with the present invention.

PREFERRED EMBODIMENTS OF THE INVENTION

In the accompanying FIGURE, number 1 indicates as a whole a hybrid propulsion road vehicle provided with two front wheels 2 and two rear driving wheels 3 which receive the driving torque from a hybrid engine power system 4.

The hybrid engine power system 4 comprises a thermal internal combustion engine 5, which is arranged in front position and is provided with a driving shaft 6, a power-operated transmission 7 transmitting the driving torque generated by the internal combustion engine 5 towards the rear driving wheels 3, and a reversible electric machine 8 (i.e. one that may act both as an electric engine by absorbing electric power and generating a mechanical driving torque, and as an electric generator by absorbing mechanical energy and generating electric power) that is mechanically connected to the power-operated transmission 7.

The power-operated transmission 7 comprises a transmission shaft 9 which is on one side angularly integral to the driving shaft 6 and on the other side is mechanically connected to a gearbox 10, which is arranged in rear position and transmits the motion to the rear driving wheels 3 by means of two axle shafts 12 which receive the motion from a differential 11. The reversible electric machine 8 is mechanically connected to the gearbox 10 and is controlled by an electric drive 13 connected to an accumulating system 14, which is able to store electric power and comprises a set of chemical batteries 15 and/or super-capacitors 15. The gearbox 10 is arranged in rear position, it receives the motion from the thermal internal combustion engine 5 and transmits the motion to the rear driving wheels 3, and comprises a gear case 16 housing all the moving parts and is attached to a frame of the road vehicle 1.

The accumulating system 14 is placed beside the gear case 16 and on the opposite sides of the gear case 16 so as not to longitudinally exceed the extension of the gear case 16 itself; specifically, the accumulating system 14 is arranged in two areas centrally defined by the gear case 16 and laterally at least partially by the rear driving wheels 3. Preferably, the electric drive 13 along with the accumulating system 14 is placed beside the gear case 16 so as to be in close proximity to the accumulating system 14 itself.

According to a preferred embodiment, the reversible electric machine 8 is mechanically connected to a shaft 17 of the gearbox 10 and specifically to a secondary shaft 17 of the gearbox 10 so as to always have a grip on the rear driving wheels 3. Moreover, according to a preferred embodiment, the reversible electric machine 8 is housed within the gear case 16 and is arranged in the rear portion of the gear case 16 (as shown in the accompanying FIGURE) or it is arranged in the front portion of the gear case 16 itself (according to a variant not shown).

Having to also insert the reversible electric machine 8 within the gear case 16, it is necessary to increase the size of the gear case 16 by longitudinally extending the gear case 16 itself; such inevitable increase in size of the gear case 16 is positive as it longitudinally increases the available space for the accumulating system 14. It is important to note that a key function of the gear case 16 is to protect the accumulating system 14 in the event of rear impacts; as a matter of fact, in the event of a rear impact of an external body against the road vehicle 1, the external body determines an initial deformation of the rear parts of the road vehicle 1 until it comes into contact with the gear case 16 which prevents further deformation as it is constrained to the frame of the road vehicle 1 and longitudinally very stiff; in this way, the accumulating system 14 that is placed beside the gear case 16 is not subjected to excessive compression in the event of a rear impact by effect of the protection offered by the gear case 16 itself. As a consequence of what described above, it is apparent that the accumulating system 14 must only be housed beside the gear case 16 and can not be housed behind the gear case 16, i.e. can not longitudinally exceed the extension of the gear case 16 itself.

As compared to a known road vehicle, the gear case 16 may be reinforced for providing a higher longitudinal strength; moreover, as compared to a known road vehicle, the link between the gear case 16 and the frame of the road vehicle 1 may be reinforced to provide a higher longitudinal strength.

The above-described road vehicle 1 has various advantages in that it is simple and cost-effective to be implemented as it is structurally very similar to an existing similar road vehicle, and above all it offers to the accumulating system 14 and to the electric drive 13 an optimal positioning from every aspect. First, the accumulating system 14 is highly protected against impacts in that it is clearly protected against frontal impacts (the most violent and the most frequent ones) as it is in the rear portion of the road vehicle 1; moreover, the accumulating system 14 is protected from the side impacts by the assembly made of the rear driving wheels 3, the axle shafts 12 and the differential 11 and is protected from the rear impacts by the gearbox 10. In this regard, it is important to note that the gear case 16 of the gearbox 10 is a very robust rigid body which is firmly attached to the frame of the road vehicle 1, as previously mentioned.

In the road vehicle 1, all the components of the electric traction system (the electric machine 8, the electric drive 13 and the accumulating system 14) are arranged very close to each other, so that on one hand the length of the connecting electric cables is reduced (thus reducing the weight of the electric cables and the power losses by Joule effect in the electric wires themselves), and on the other hand it is easier to implement an effective electric isolation in order to avoid the risk of electric lightning strikes during maintenance.

In the road vehicle 1, the accumulating system 14 is arranged in a position which is not subject to specific overheating and which may be easily connected to the outside in order to ensure adequate ventilation (that is necessary to provide adequate venting of gas towards the outside in case of failure).

Finally, in the road vehicle 1, the accumulating system 14 is placed in a central position and may be placed reasonably close to the ground in order not to unbalance the road vehicle 1 by means of its own considerable mass.

The invention claimed is:

1. Hybrid propulsion road vehicle (1) comprising:
   a couple of rear driving wheels (3);
   a thermal internal combustion engine (5);
   a gearbox (10), arranged in a rear position, which receives motion from the thermal internal combustion engine (5) and transmits motion to the rear driving wheels (3), and comprises a gear case (16) housing moving parts;
   a reversible electric machine (8) mechanically connectable to the rear driving wheels (3);
   an electric drive (13) controlling the electric machine (8); and
   an accumulating system (14), which is able to store electric energy and is connected to the electric drive (13);
   wherein the accumulating system (14) is placed beside the gear case (16) and on the opposite sides of the gear case (16) not to longitudinally exceed the extension of the gear case (16).

2. Road vehicle (1) according to claim 1, wherein the accumulating system (14) is placed in two spaces, centrally delimited by the gear case (16) and laterally at least partially delimited by the rear driving wheels (3).

3. Road vehicle according to claim 1, wherein the electric drive (13) is placed, together with the accumulating system (14), beside the gear case (16).

4. Road vehicle (1) according to claim 1, wherein the reversible electric machine (8) is mechanically connected to a shaft (17) of the gearbox (10).

5. Road vehicle (1) according to claim 1, wherein the reversible electric machine (8) is mechanically connected to a secondary shaft (17) of the gearbox (10).

6. Road vehicle (1) according to claim 4, wherein the reversible electric machine (8) is housed inside the gear case (16).

7. Road vehicle (1) according to claim 4, wherein the reversible electric machine (8) is housed inside the gear case (16) and is placed in the rear part of the gear case (16).

8. Road vehicle (1) according to claim 4, wherein the reversible electric machine (8) is housed inside the gear case (16) and is placed in the front part of the gear case (16).

* * * * *